Oct. 28, 1952 D. K. DEAN ET AL 2,615,833
METHOD AND APPARATUS FOR STRIPPING VOLATILES FROM FLUIDS
Filed Sept. 25, 1948 2 SHEETS—SHEET 1
Fig. 1.
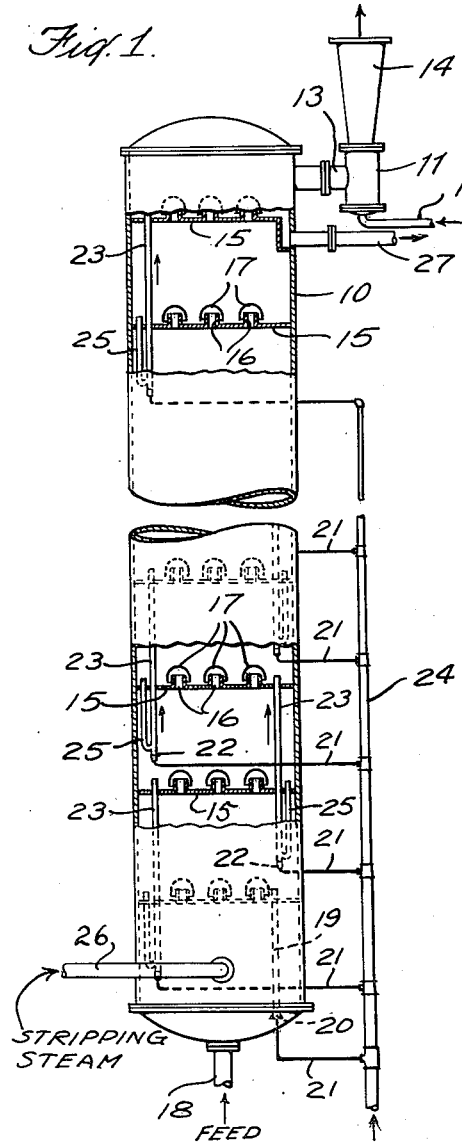
Fig. 2.
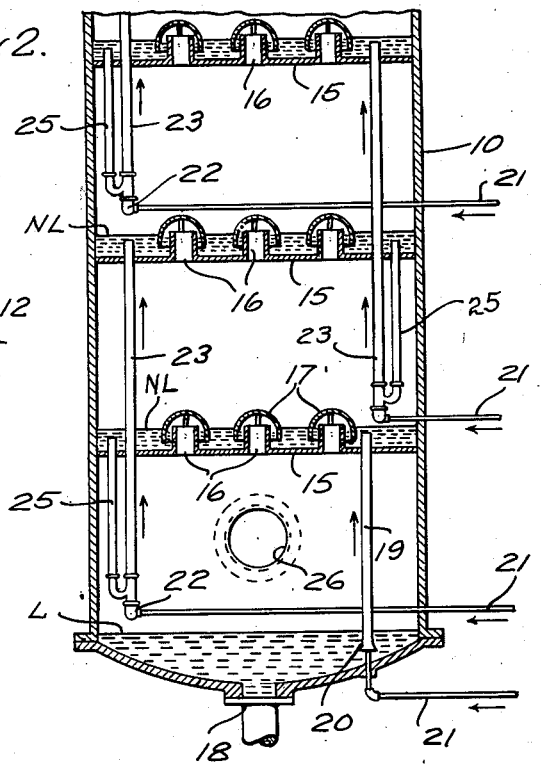
Fig. 3.
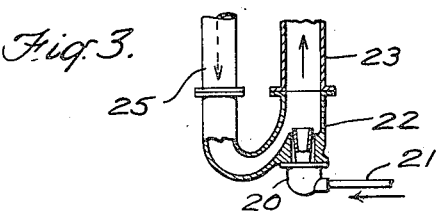
Fig. 4.
INVENTORS
DION K. DEAN
FRANCIS B. WHITE
BY E. Francis Wentworth Jr.
ATTORNEY

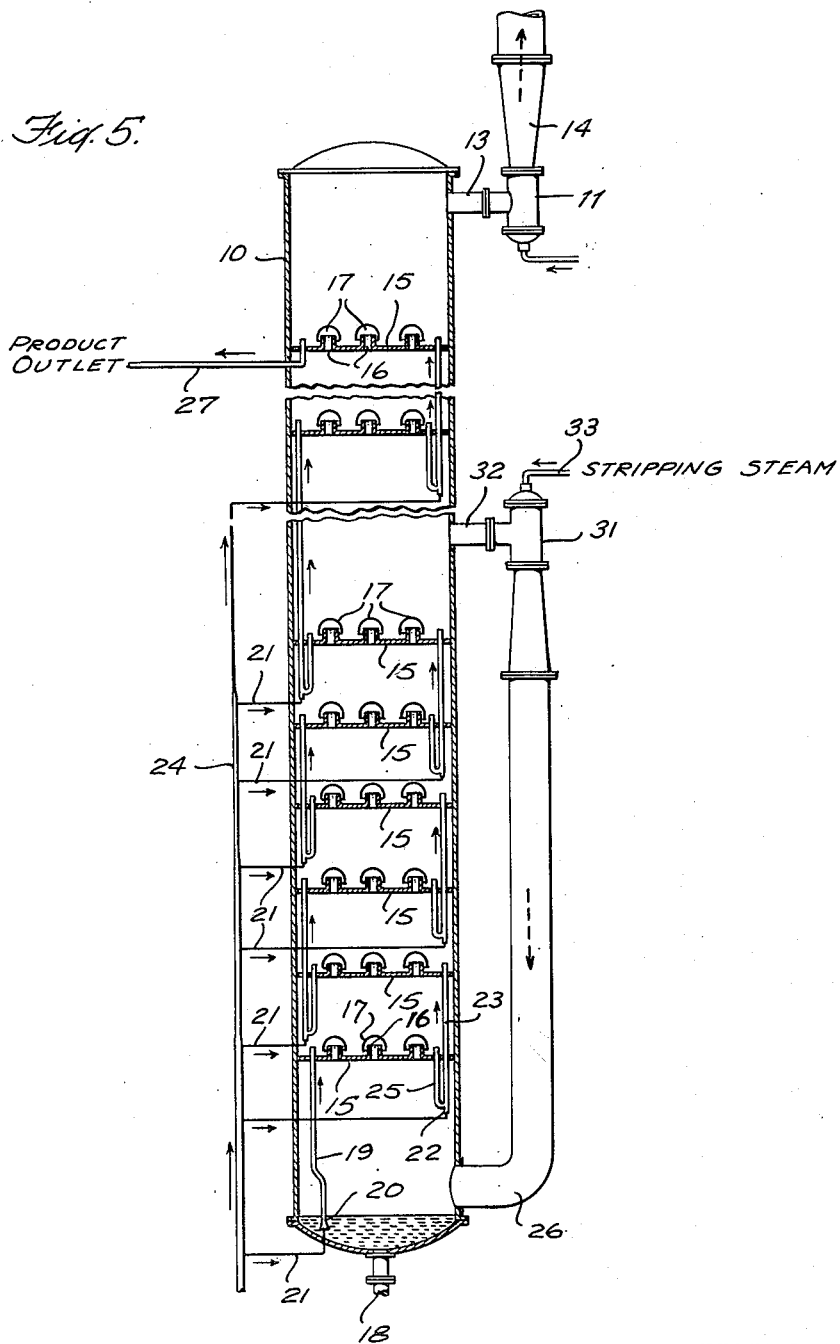

Patented Oct. 28, 1952

2,615,833

UNITED STATES PATENT OFFICE 2,615,833

METHOD AND APPARATUS FOR STRIPPING VOLATILES FROM FLUIDS

Dion K. Dean, Rahway, N. J., and Francis B. White, Elmhurst, N. Y., assignors to Foster Wheeler Corporation, New York, N. Y., a corporation of New York Application September 25, 1948, Serial No. 51,212

23 Claims. (Cl. 202—46)

1

This invention relates to the stripping of volatiles from a fluid and more particularly pertains to a process of, and apparatus for, deodorization of animal oils and vegetable oils, such as cotton seed oil, corn oil and the like. The deodorization of such oils is mainly for the purpose of producing edible products, although not necessarily limited thereto, by the removal from the raw oil of free fatty acids and other undesirable volatile substances that would otherwise adversely affect the product with respect to color and taste or cause deterioration.

In the usual processes of stripping volatiles from a fluid, for example, in deodorizing vegetable oils, a stripping or deodorizing tower having vapor and liquid contact means, such as a plurality of bubble trays extending in vertical spaced horizontal planes, is used. The oil is introduced at the upper part of the column and is normally subjected to the desired operating vacuum created by a steam booster positioned at the top of the tower, thereafter to flow downwardly through the various bubble trays countercurrent to and in contact with stripping steam which is introduced at the bottom of the column. The finished product is then removed from the bottom of the tower while the steam and vapor and non-condensible gases are removed from the upper part thereof. In such processes, the highest vacuum is produced on the entering oil and, because of the pressure drop through the several bubble trays, the absolute pressure at the lower portion of the tower is higher than that at the upper portion thereof with the result that the volume of stripping steam in the lower section of the tower is much less than in said upper section and the effectiveness of the stripping steam is accordingly reduced. Also, there is a loss of temperature of the oil as it passes through the successive bubble trays which causes a loss of effectiveness of the stripping from the top to the bottom thereof.

The present invention overcomes the disadvantages of the prior process by introducing both the stripping steam and the oil to be treated at the bottom of the tower. After introduction into the lower portion of the tower, oil is conducted from the bottom upwardly through each successive tower tray from the lowermost tray upwardly to the uppermost tray. Stripping steam will pass upwardly through successive trays from the bottom to the top of the tower and will flow in contact with the oil contained on the various trays. The stripped oil is removed from the uppermost tray in the tower and the stripping steam and vapor and non-condensible gases will also be removed from the top of the tower by the steam booster.

The invention will be understood from the following description when considered in connection with the accompanying drawings forming a part thereof and in which:

Fig. 1 is a vertical sectional view with part in elevation, illustrating diagrammatically one form of the invention;

Fig. 2 is a vertical sectional view of a portion of the apparatus shown in Fig. 1 but on an enlarged scale;

Fig. 3 is an enlarged view partly in section of the apparatus for lifting liquid from one tray to a tray above in the present invention;

Fig. 4 is a fragmentary sectional view showing another form of the invention; and Fig. 5 is a view similar to Fig. 1, but of another embodiment of the invention.

Like characters of reference refer to like parts throughout the several views.

Referring to the form of the invention illustrated in Fig. 1, the reference numeral 10 designates a deodorizing tower or column in which is maintained a vacuum created by a thermo-compressor 11 connected with a steam supply through a conduit 12 and in communication with the upper part of the deodorizing column 10 at one side thereof through suction 13 of said thermo-compressor. The thermo-compressor would usually discharge into a high vacuum condenser, not shown, through its discharge 14. The tower 10 has a plurality of vertically spaced bubbled trays 15 each of which is coextensive in area with the inside diameter of the tower. Trays 15 each have a plurality of risers 16 which support bubble caps 17.

Oil to be deodorized is fed into the lower part of tower 10 through feed pipe 18 and, in accordance with the present invention, is thereafter passed through the bubble trays 15 from the lowermost tray in tower 10 to the uppermost bubble tray therein. As shown, particularly in Fig. 2, oil charged to the bottom of tower 10 through line 18 is fed upwardly from said bottom to the lowermost bubble tray in the tower through a feed line 19 by means of an ejector 20 at the lowermost end of said line which ejector receives steam through pipe 21. The suction of ejector 20 communicates with the bottom portion of tower 10 below the normal liquid level L of oil charged to said tower through line 18 and discharges into line 19. Oil from the lowermost tray is conducted to the next succeeding bubble tray thereabove by means of a tube 25 in communication at the upper end thereof with said tray at or slightly below the normal liquid level thereon and extending downwardly to communicate with the inlet of an ejector 22 positioned below said lowermost tray. The outlet of the ejector 22 communicates with the lowermost end of an upwardly extending feed tube 23 which in turn communicates with the next successive bubble tray above the lowermost tray at a point below the normal liquid level NL on said tray. Ejector 22 receives steam from steamline 24. Tube 25 is of sufficient length in comparison to the length of tube 23 that a hydrostatic head is provided which is greater than that represented by the mixture of oil and steam within tube 23. Throughout the remainder of the column, each tray is in communication with the tray next above through pipe 25, ejector 22, and pipe 23 in the same manner as the lowermost tray and the next succeeding tray above are in communication. Steam is supplied to each of the pipes 21, which communicate with the intake of the ejectors 22, through a main steam feed line 24.

Stripping steam is conducted to the lower part of column 10 through inlet conduit 26 while stripped oil or finished product is removed from the uppermost tray 15 through outlet conduit 27.

In operation, oil from which undesirable volatiles are to be stripped, is fed to the bottom of tower 10 through feed pipe 18 and is thereafter, by operation of ejector 20, drawn upwardly through line 19 and discharged into lowermost tray 15. Stripping steam also flows into the lower portion of the tower, but through inlet conduit 26, thereafter to pass upwardly through the tower, firstly flowing upwardly through risers 16 in the lowermost tray 15 to be directed downwardly by bubble caps 17, positioned over said risers, and into oil on said lowermost tray. After bubbling through oil on said lowermost tray and stripping undesirable volatiles therefrom, the stripping steam passes upwardly into the risers 16 of the tray next above said lowermost tray and thence into the bubble caps and thereafter through oil on said next tray above the lowermost tray which oil is conducted to said next tray by action of ejector 22 receiving steam at the inlet thereof from main steam feed line 24 through pipe 21. The action of steam ejector 22 causes oil from the lowermost tray to be drawn through tube 25 and thence lifted through feed tube 23 to said tray next above. Thereafter, throughout the remainder of the column oil is passed from a lower tray to the tray next higher in a like manner and the oil on each tray is stripped by stripping steam flowing upwardly after passing through oil on the tray beneath.

Stripped or finished product is removed from the uppermost tray through outlet conduct 27 while stripping steam and vapor and non-condensibles are drawn outwardly of the top of tower 10 through suction 13 of the thermo-compressor 11.

In the embodiment of the invention shown in Fig. 4, the oil being lifted from a lower tray to the tray above is heated as it is passed to the upper tray. As shown, the feed tube 23 and ejector 22 are disposed exteriorly of tower. Tube 23, which extends between adjacent trays, passes through a heating jacket 28. A heated vapor, such as steam, a high boiling point liquid, for example, diphenyl, diphenyl oxide (Dowtherm) or other heated vapor, or a heated liquid enters jacket 28 through inlet line 29 and, after passing in indirect heat exchange relationship with the oil being lifted from a lower to the next adjacent upper tray, flows from the jacket through outlet line 30. Otherwise, the operation of the embodiment illustrated in Fig. 4 is similar to that of the form of the invention shown in Figs. 1 and 2.

Fig. 5 illustrates an embodiment of the present invention wherein the volume of stripping steam flowing through the trays in the lower portion of tower is increased so as to be substantially equivalent to the volume of stripping steam flowing through the trays in the upper portion of the tower which latter trays are under a higher vacuum than said lower trays. As shown, recirculating thermo-compressor 31 has its suction pipe 32 in communication with tower 10 intermediate the opposite ends of said tower. The recirculating thermo-compressor 31 is actuated by stripping steam which enters through line 33 and flows outwardly of said compressor into stripping steam inlet conduit 26 which conducts stripping steam into the lower portion of tower 10 beneath the lowermost tray.

In operation, stripping steam enters compressor 31 through line 33 and passes therethrough, creating a suction in pipe 32, and into conduit 26 whence it flows into tower 10. Suction in pipe 32 withdraws stripping steam and vapor from the tower at an intermediate point therein which, together with stripping steam from line 33, passes into the bottom of the tower through conduit 26. The efficiency of bubble trays 15 below the level of pipe 32, which ordinarily would be decreased due to the pressure drop through the trays from the top of the tower causing a decreased volume of steam to flow over these trays, is increased without increasing the volume of steam fed to the tower because the oil or other fluid passing through the trays below pipe 32 is brought in contact with a greater volume of stripping steam. The increased volume of stripping steam in the zones of higher pressure causes a greater amount of undesirable volatile substances to be removed from the oil in these zones which results in a greater overall efficiency of the tower. Any oil entrained in the vapor withdrawn through pipe 32 is returned to the bottom of the tower in admixture with stripping steam to be recirculated through the tower.

The expression "steam" as used in the specification and claims when applied to the introduction of a stripping medium into the tower, includes within its scope vapor and gas, as well as steam, whether or not it is reactant or non-reactant with respect to the liquid under treatment.

It will be understood that changes may be made in the form, location and relative arrangement of the several parts of the appartaus disclosed, and in the sequence of the steps of the method disclosed, without departing from the principles of the invention. Accordingly, the invention is not to be limited excepting by the scope of the appended claims.

What is claimed is:

1. Apparatus for stripping volatile substance from a liquid, said apparatus comprising an upright column, means for introducing a liquid to be stripped of volatile substance into the lower portion of the column, means for introducing a stripping medium into the lower portion of said column, a plurality of vertically spaced vapor and liquid contact devices in the column so constructed and arranged that stripping medium passes upwardly therethrough and in contact with liquid therein, conduit means having an inlet communicating with said lower portion of the column so as to receive liquid to be stripped and an outlet communicating with a vapor and liquid contact device disposed at a lower elevation in the column than other of said contact devices, means for causing liquid to flow in said conduit means from the inlet to the outlet thereof, other conduits connecting adjacent contact devices, each of said other conduits having an inlet and an outlet in communication respectively with the lower and the upper contact devices of adjacent vapor and liquid contact devices, means for causing liquid to flow upwardly from the inlet to the outlet of said other conduits, vacuum creating means having its suction in communication with the upper part of the column above an upper vapor and liquid contact device and its discharge connected to a point outside the column whereby a vacuum is maintained in the column and stripping medium and volatile substance is withdrawn thereby from the column at the upper part thereof, outlet conduit means in communication with said upper vapor and liquid contact device through which stripped liquid is withdrawn from said upper contact device and the column, and recycling means having an inlet in communication with the interior of the column intermediate the point of introduction of said liquid to be stripped into and the withdrawal of said liquid from the column and an outlet in communication with the column at a point below the point of communication of said inlet, said recycling means being adapted to withdraw stripping medium from the column through the inlet thereof and pass the withdrawn stripping medium to the outlet thereof.

2. Apparatus for stripping volatile substance from a liquid, said apparatus comprising an upright column, means for introducing a liquid to be stripped of volatile substance into the lower portion of the column, means for introducing a stripping medium into the lower portion of said column, a plurality of vertically spaced vapor and liquid contact devices in the column so constructed and arranged that stripping medium passes upwardly therethrough and in contact with liquid therein, conduit means having an inlet communicating with said lower portion of the column so as to receive liquid to be stripped and an outlet communicating with the lowermost vapor and liquid contact device in the column, means for causing liquid to flow in said conduit means from the inlet to the outlet thereof, other conduits connecting adjacent contact devices from said lowermost contact device upwardly in the column, each of said other conduits having an inlet and an outlet in communication respectively with the lower and the upper contact devices of adjacent vapor and liquid contact devices, means for causing liquid to flow upwardly from the inlet to the outlet of said other conduits, vacuum creating means having its suction in communication with the upper part of the column above an upper vapor and liquid contact device and its discharge connected to a point outside the column whereby a vacuum is maintained in the column and stripping medium and voltaile substance is withdrawn thereby from the column at the upper part thereof, outlet conduit means in communication with said upper vapor and liquid contact device through which stripped liquid is withdrawn from said upper contact device and the column, and recycling means having an inlet in communication with the interior of the column intermediate the point of introduction of said liquid to be stripped into and the withdrawal of said liquid from the column and an outlet in communication with the column at a point below the point of communication of said inlet, said recycling means being adapted to withdraw stripping medium from the column through the inlet thereof and pass the withdrawn stripping medium to the outlet thereof.

3. Apparatus for stripping volatile substance from a liquid, said apparatus comprising a column, means for introducing a liquid to be stripped of volatile substance into the lower portion of the column, means for introducing a stripping medium into the lower portion of said column, a plurality of vertically spaced vapor and liquid contact devices in the column so constructed and arranged that stripping medium passes upwardly therethrough and in contact with liquid therein, conduit means having an inlet communicating with said lower portion of the column so as to receive liquid to be stripped and an outlet communicating with a vapor and liquid contact device disposed at a lower elevation in the column than other of said contact devices, means for causing liquid to flow in said conduit means from the inlet to the outlet thereof, other conduit means having an inlet portion and an outlet portion, the inlet portion communicating with said lower vapor and liquid contact device and extending downwardly therefrom to communicate with the outlet portion, said outlet portion extending upwardly from the point of communication with the inlet portion to the vapor and liquid contact device above said lower contact device to discharge thereinto, means associated with said other conduit to cause liquid to flow from said lower contact device to said contact device above through the inlet and outlet portions of said other conduit, vacuum creating means having its suction in communication with the upper part of the column above an upper vapor and liquid contact device and its discharge connected to a point outside the column whereby a vacuum is maintained in the column and stripping medium and volatile substance is withdrawn thereby from the column at the upper part thereof, outlet conduit means in communication with said upper vapor and liquid contact device through which stripped liquid is withdrawn from said upper contact device and the column, and recycling means having an inlet in communication with the interior of the column intermediate the point of introduction of said liquid to be stripped into and the withdrawal of said liquid from the column and an outlet in communication with the column at a point below the point of communication of said inlet, said recycling means being adapted to withdraw stripping medium from the column through the inlet thereof and pass the withdrawn stripping medium to the outlet thereof.

4. Apparatus for stripping volatile substance from a liquid, said apparatus comprising an upright column, means for introducing a liquid to be stripped of volatile substance into the lower portion of the column, means for introducing a stripping medium into the lower portion of said column, a plurality of vertically spaced vapor and liquid contact devices in the column so constructed and arranged that stripping medium passes upwardly therethrough and in contact with liquid therein, conduit means having an inlet communicating with said lower portion of the column so as to receive liquid to be stripped and an outlet communicating with a vapor and liquid contact device disposed at a lower elevation in the column than other of said contact devices, means for causing liquid to flow in said conduit means from the inlet to the outlet thereof, other conduit means having an inlet communicating with said lower vapor and liquid contact device and an outlet in communication with a vapor and liquid contact device above said lower contact device, a steam ejector associated with said other conduit means so as to cause liquid to flow from the inlet to the outlet of said other conduit, vacuum creating means having its suction in communication with the upper part of the column above an upper vapor and liquid contact device and its discharge connected to a point outside the column whereby a vacuum is maintained in the column and stripping medium and volatile substance is withdrawn thereby from the column at the upper part thereof, outlet conduit means in communication with said upper vapor and liquid contact device through which stripped liquid is withdrawn from said upper contact device and the column, and recycling means having an inlet in communication with the interior of the column intermediate the point of introduction of said liquid to be stripped into and the withdrawal of said liquid from the column and an outlet in communication with the column at a point below the point of communication of said inlet, said recycling means being adapted to withdraw stripping medium from the column through the inlet thereof and pass the withdrawn stripping medium to the outlet thereof.

5. Apparatus for stripping volatile substance from a liquid, said apparatus comprising a column, means for introducing a liquid to be stripped of volatile substance into the lower portion of the column, means for introducing a stripping medium into the lower portion of said column, a plurality of vertically spaced vapor and liquid contact devices in the column so constructed and arranged that stripping medium passes upwardly therethrough and in contact with liquid therein, conduit means having an inlet communicating with said lower portion of the column so as to receive liquid to be stripped and an outlet communicating with a vapor and liquid contact device disposed at a lower elevation in the column than other of said contact devices, means for causing liquid to flow in said conduit means from the inlet to the outlet thereof, other conduit means having an inlet portion and an outlet portion, the inlet portion communicating with said lower vapor and liquid contact device and extending downwardly therefrom to communicate with the outlet portion, said outlet portion extending upwardly from the point of communication with the inlet portion to the vapor and liquid contact device above said lower contact device to discharge thereinto, a steam ejector associated with said other conduit having its suction in communication with the inlet portion and its discharge in communication with the outlet portion whereby liquid from the lower contact device is caused to flow downwardly through said inlet portion of the other conduit thence upwardly through said outlet portion to said contact device above, vacuum creating means having its suction in communication with the upper part of the column above an upper vapor and liquid contact device and its discharge connected to a point outside the column whereby a vacuum is maintained in the column and stripping medium and volatile substance is withdrawn thereby from the column at the upper part thereof, outlet conduit means in communication with said upper vapor and liquid contact device through which stripped liquid is withdrawn from said upper contact device and the column, and recycling means having an inlet in communication with the interior of the column intermediate the point of introduction of said liquid to be stripped into and the withdrawal of said liquid from the column and an outlet in communication with the column at a point below the point of communication of said inlet, said recycling means being adapted to withdraw stripping medium from the column through the inlet thereof and pass the withdrawn stripping medium to the outlet thereof.

6. Apparatus for the continuous deodorization of animal or vegetable oils comprising a column, means for continuously introducing oil to be deodorized into the lower portion of the column, means for continuously introducing a stripping medium into the lower portion of the column, a plurality of vertically spaced bubble trays in the column, conduit means extending between said lower portion of the column and a lower bubble tray therein, the inlet of said conduit being in communication with said lower portion to receive oil therefrom and the outlet of the conduit being in communication with the lower tray to discharge oil thereinto, a steam jet associated with said conduit so as to cause flow of oil from the inlet to the outlet of the conduit, other conduits connecting adjacent bubble trays from said lower bubble tray upwardly in the column, each of said other conduits having an inlet portion and an outlet portion, the inlet portion and outlet portion being in communication respectively with the lower and the upper trays of adjacent bubble trays, each of the inlet portions of said other conduit communicating with the lower tray of adjacent bubble trays and extending downwardly therefrom to communicate with the outlet portion, said outlet portion extending upwardly from the point of communication with the inlet portion to the tray next above said lower tray to discharge thereinto, a steam ejector associated with each of said other conduits, the ejectors having their suctions in communication with the inlet portions of said other conduits and their outlets in communication with said outlet portion thereof whereby oil from said lower tray is caused to flow downwardly through said inlet portion thence upwardly through said outlet portion of the conduits to said bubble tray next above the lower tray of adjacent trays, vacuum creating means having its suction in communication with the upper part of the column above an upper bubble tray and its discharge connected to a point outside the column whereby a vacuum is maintained in the column and stripping medium and volatile substance is withdrawn thereby from the column at the upper part thereof, and an outlet conduit in communication with said upper bubble tray in the column and through which stripped oil is withdrawn from said upper tray and from the column.

7. Apparatus for the continuous deodorization of animal or vegetable oils comprising an upright column, means for continuously introducing oil to be deodorized into the lower part of the column, means for continuously introducing a stripping medium into the lower portion of the column, a plurality of vertically spaced bubble trays in the column, conduit means extending between said lower portion of the column and a lower bubble tray therein, the inlet of said conduit being in communication with said lower portion to receive oil therefrom and the outlet of the conduit being in communication with the lower tray to discharge oil thereinto, a steam jet associated with said conduit so as to cause flow of oil from the inlet to the outlet of the conduit, other conduits connecting adjacent bubble trays from said lower bubble tray upwardly in the column, each of said other conduits having an inlet portion and an outlet portion, the inlet portion and outlet portion being in communication respectively with the lower and the upper trays of adjacent bubble trays, each of the inlet portions of said other conduits communicating with the lower tray of adjacent bubble trays and extending downwardly therefrom to communicate with the outlet portion, said outlet portion extending upwardly from the point of communication with the inlet portion exteriorly of the tower to the tray next above said lower tray to discharge thereinto, a jacket around said outlet portion of the other conduits, means for introducing a heating medium into said jacket, means for withdrawing heating medium from the jacket after said medium has passed in heat exchange relationship with said outlet portion of the other conduits, a steam ejector associated with each of said other conduits, the ejectors having their suctions in communication with the inlet portion of the other conduits and their outlets in communication with the outlet portion thereof whereby oil from said lower tray is caused to flow downwardly through said inlet portion thence upwardly through said outlet portion of the conduits to the bubble tray next above the lower tray of adjacent trays, vacuum creating means having its suction in communication with the upper part of the column above an upper bubble tray and its discharge connected to a point outside the column whereby a vacuum is maintained in the column and stripping medium and volatile substance is withdrawn thereby from the column at the upper part thereof, and an outlet conduit in communication with said upper bubble tray in the column and through which stripped oil is withdrawn from said upper tray and from the column.

8. Apparatus for stripping volatile substance from a liquid comprising a column, means for introducing a liquid to be stripped of volatile substance into the lower portion of the column, means for introducing a stripping medium into the lower portion of said column, a plurality of vertically spaced vapor and liquid contact devices in the column so constructed and arranged that stripping medium passes upwardly therethrough and in contact with liquid therein, conduit means having an inlet communicating with said lower portion of the column so as to receive liquid to be stripped and an outlet communicating with a vapor and liquid contact device disposed at a lower elevation in the column than other of said contact devices, means for causing liquid to flow in said conduit means from the inlet to the outlet thereof, other conduit means having an inlet communicating with said lower vapor and liquid contact device and an outlet in communication with a vapor and liquid contact device above said lower contact device, means for causing liquid to flow from the inlet to the outlet of said other conduit, means in communication with the upper part of the column for producing and maintaining a vacuum in the column, means for withdrawing stripping medium and volatile substance from the upper part of the column, outlet conduit means in communication with an upper vapor and liquid contact device through which stripped liquid is withdrawn from said upper contact device and the column, and recycling means having an inlet in communication with the interior of the column intermediate the point of introduction of said liquid to be stripped into and the withdrawal of said liquid from the column and an outlet in communication with the column at a point below the point of communication of said inlet, said recycling means being adapted to withdraw stripping medium from the column through the inlet thereof and pass the withdrawn stripping medium to the outlet thereof.

9. Apparatus for stripping volatile substance from a liquid comprising a column, means for introducing a liquid to be stripped of volatile substance into the lower portion of the column, said column having a stripping medium inlet in the lower portion thereof through which stripping medium is introduced into the column, means for introducing a stripping medium into the lower portion of said column, a plurality of vertically spaced vapor and liquid contact devices in the column so constructed and arranged that stripping medium passes upwardly therethrough and in contact with liquid therein, conduit means having an inlet communicating with said lower portion of the column so as to receive liquid to be stripped and an outlet communicating with a vapor and liquid contact device disposed at a lower elevation in the column than other of said contact devices, means for causing liquid to flow in said conduit means from the inlet to the outlet thereof, other conduit means having an inlet communicating with said lower vapor and liquid contact device and an outlet in communication with a vapor and liquid contact device above said lower contact device, means for causing liquid to flow from the inlet to the outlet of said other conduit, means in communication with the upper part of the column for producing and maintaining a vacuum in the column, means for withdrawing stripping medium and volatile substance from the upper part of the column, outlet conduit means in communication with an upper vapor and liquid contact device through which stripped liquid is withdrawn from said upper contact device and the column, recycling means comprising a thermo-compressor actuated by stripping medium under pressure, the thermo-compressor having an inlet in communication with the interior of the column intermediate the point of introduction of said liquid to be stripped into and the withdrawal of said liquid from the column and a discharge in communication with the column through said stripping medium inlet, and means for introducing stripping medium into said thermo-compressor to actuate said compressor, said recycling means being adapted to withdraw stripping medium from the column through the compressor inlet and pass the withdrawn stripping medium and stripping medium used for actuation of the thermo-compressor into the column through said stripping medium inlet.

10. Apparatus for the continuous deodorization of animal or vegetable oils comprising a column, means for continuously introducing oil to be deodorized into the lower part of the column, said column having a steam stripping medium inlet in the lower part thereof through which stripping medium in introduced into the column, a plurality of vertically spaced bubble trays in the column, conduit means extending between said lower portion of the column and a lower bubble tray therein, the inlet of said conduit being in communication with said lower portion to receive oil therefrom and the outlet of the conduit being in communication with the lower tray to discharge oil thereinto, a steam jet associated with said conduit so as to cause flow of oil from the inlet to the outlet of the conduit, other conduits connecting adjacent contact devices from said lower bubble tray upwardly in the column, each of said other conduits having an inlet portion and an outlet portion, the inlet portion and outlet portion being in communication respectively with the lower and the upper trays of adjacent bubble trays, each of the inlet portions of said other conduits communicating with the lower tray of adjacent bubble trays and extending downwardly therefrom to communicate with the outlet portion, said outlet portion extending upwardly from the point of communication with the inlet portion to the tray next above said lower tray to discharge thereinto, a steam ejector associated with each of said other conduits the ejectors having their suctions in communication with the inlet portion of said other conduits and their outlets in communication with the outlet portion thereof whereby oil from the lower tray is caused to flow downwardly through said inlet portion thence upwardly through said outlet portion of the conduits to said bubble tray next above the lower tray of adjacent trays, a thermo-compressor having its suction in communication with the upper part of the column and its discharge connected to a point outside the column whereby a vacuum is maintained in the column and stripping medium and volatile substance is withdrawn from the column at the upper part thereof, an outlet conduit in communication with an upper bubble tray in the column and through which stripped oil is withdrawn from said upper tray and from the column, recycling means comprising another thermo-compressor actuated by stripping steam under pressure, the other thermo-compressor having an inlet in communication with the interior of the column intermediate the point of introduction of the oil to be deodorized and the withdrawal of the deodorized oil from the column and a discharge in communication with the column through said stripping medium inlet, and means for introducing stripping medium into said other thermo-compressor to actuate said compressor, said recycling means being adapted to withdraw stripping medium from the column through the other compressor inlet and pass the withdrawn stripping medium and stripping medium used for actuation of the thermocompressor into the column through said stripping medium inlet.

11. The process of stripping volatiles from a liquid containing the same which comprises flowing said liquid into the lower portion of a stripping zone having a plurality of vertically spaced liquid and vapor contact zones therein, passing said liquid from the lower portion of the stripping zone to a lower vapor and liquid contact zone therein, flowing the liquid from said lower contact zone to a contact zone thereabove, passing a gaseous stripping medium upwardly from the lower portion of the stripping zone and in contact with liquid in the liquid contact zones, withdrawing stripped liquid from the upper part of said stripping zone, and withdrawing stripping medium and stripped volatiles from said upper part of the stripping zone.

12. In a continuous process of deodorizing animal or vegetable oils, continuously introducing oil to be deodorized into the lower portion of an elongated stripping zone having a plurality of vertically spaced liquid and vapor contact zones therein, passing said oil upwardly from said lower portion of the stripping zone and serially through said vapor and liquid contact zone from a lower contact zone to an upper contact zone in the stripping zone, passing a gaseous stripping medium upwardly from the lower portion of the stripping zone serially through said contact zones from said lower contact zone to said upper contact zone and in contact with oil therein, withdrawing stripped oil from said upper contact zone, and withdrawing stripping medium and stripped volatiles from said upper part of the stripping zone.

13. The process of stripping volatiles from a liquid containing the same which comprises flowing said liquid into the lower portion of a stripping zone having a plurality of vertically spaced liquid and vapor contact zones therein, passing said liquid from the lower portion of the stripping zone to a lower vapor and liquid contact zone therein, flowing the liquid from said lower contact zone to a contact zone thereabove, passing a gaseous stripping medium upwardly from the lower portion of the stripping zone and in contact with liquid in the liquid contact zones, maintaining said stripping zone under vacuum from a point at the upper part thereof, withdrawing stripped liquid from the upper part of said stripping zone, and withdrawing stripping medium and stripped volatiles from said upper part of the stripping zone.

14. The process of stripping volatiles from a liquid containing the same which comprises flowing said liquid into the lower portion of a stripping zone having a plurality of vertically spaced liquid and vapor contact zones therein, passing said liquid from the lower portion of the stripping zone to a lower vapor and liquid contact zone therein, flowing the liquid from said lower contact zone to a contact zone thereabove, passing a gaseous stripping medium upwardly from the lower portion of the stripping zone and in contact with liquid in the liquid contact zones, withdrawing stripped liquid from the upper part of said stripping zone, recycling stripping medium by withdrawing a portion thereof from a point intermediate the upper and lower parts thereof and returning said withdrawn medium to the lower portion of the stripping zone, and withdrawing stripping medium and stripped volatiles from said upper part of the stripping zone.

15. In a continuous process of deodorizing animal or vegetable oils, continuously introducing oil to be deodorized into the lower portion of an elongated stripping zone having a plurality of vertically spaced liquid and vapor contact zones therein, passing said oil upwardly from said lower portion of the stripping zone and serially through said vapor and liquid contact zone from a lower contact zone to an upper contact zone in the stripping zone, passing a gaseous stripping medium upwardly from the lower portion of the stripping zone and serially through said contact zones from said lower contact zone to said upper contact zone and in contact with oil therein, maintaining said stripping zone under vacuum from a point at the upper part thereof, withdrawing stripped liquid from the upper part of said stripping zone, and withdrawing stripping medium and stripped volatiles from said upper part of the stripping zone.

16. In a continuous process of deodorizing animal or vegetable oils, continuously introducing oil to be deodorized into the lower portion of an elongated stripping zone having a plurality of vertically spaced liquid and vapor contact zones therein, passing the oil upwardly from said lower portion of the stripping zone and serially through said vapor and liquid contact zones from a lower contact zone to an upper contact zone in the stripping zone, passing a gaseous stripping medium upwardly from the lower portion of the stripping zone serially through said contact zones from said lower contact zone to said upper contact zone and in contact with oil therein, passing the oil flowing from a lower contact zone to a higher contact zone in indirect heat exchange relationship with a heating medium, withdrawing stripped oil from the said upper contact zone, and withdrawing stripping medium and stripped volatiles from said upper part of the stripping zone.

17. Apparatus for the continuous deodorization of animal or vegetable oils comprising an upright column, means for continuously introducing oil to be deodorized into the lower portion of the column, means for continuously introducing a stripping medium into the lower portion of the column, a plurality of vertically spaced bubble trays in the column, conduit means extending between said lower portion of the column and a lower bubble tray therein, the inlet of said conduit being in communication with said lower portion to receive oil therefrom and the outlet of the conduit being in communication with the lower tray to discharge oil thereinto, a steam jet associated with said conduit so as to cause flow of oil from the inlet to the outlet of the conduit, other conduit means having an inlet communicating with said lower bubble tray and an outlet in communication with the adjacent tray next above said lower tray, a steam ejector associated with said other conduit so as to cause oil to flow from the inlet to the outlet thereof, means for withdrawing stripping medium and volatile substance from the upper part of the column, an outlet conduit in communication with an upper bubble tray in the column and through which stripped oil is withdrawn from said upper tray and from the column, and recycling means having an inlet in communication with the interior of the column intermediate the point of introduction of said liquid to be stripped into and the withdrawal of said liquid from the column and an outlet in communication with the column at a point below the point of communication of said inlet, said recycling means being adapted to withdraw stripping medium from the column through the inlet thereof and pass the withdrawn stripping medium to said recycling means outlet.

18. The process of stripping volatiles from a liquid containing the same which comprises flowing said liquid into the lower portion of a stripping zone having a plurality of vertically spaced liquid and vapor contact zones therein, passing said liquid from the lower portion of the stripping zone to a lower vapor and liquid contact zone therein, flowing the liquid from said lower contact zone to a contact zone thereabove, passing a gaseous stripping medium upwardly from the lower portion of the stripping zone and in contact with liquid in the liquid contact zones, passing the liquid flowing from a lower contact zone to a higher contact zone in indirect heat exchange relationship with a heating medium, withdrawing stripped liquid from the upper part of said stripping zone, and withdrawing stripping medium and stripped volatiles from said upper part of the stripping zone.

19. In a continuous process of deodorizing animal or vegetable oils, continuously introducing oil to be deodorized into the lower portion of an elongated stripping zone having a plurality of vertically spaced liquid and vapor contact zones therein, passing said oil upwardly from said lower portion of the stripping zone and serially through said vapor and liquid contact zone from a lower contact zone to an upper contact zone in the stripping zone, passing a gaseous stripping medium upwardly from the lower portion of the stripping zone serially through said contact zones from said lower contact zone to said upper contact zone and in contact with oil therein, withdrawing stripped oil from said upper contact zone, recycling stripping medium by withdrawing a portion thereof from a point intermediate the upper and lower parts thereof and returning said withdrawn medium to the lower portion of the stripping zone, and withdrawing stripping medium and stripped volatiles from said upper part of the stripping zone.

20. Apparatus for the continuous deodorization of animal or vegetable oils comprising a column, means for continuously introducing oil to be deodorized into the lower portion of the column, means for continuously introducing a stripping medium into the lower portion of the column, a plurality of vertically spaced bubble trays in the column, conduit means extending between said lower portion of the column and a lower bubble tray therein, the inlet of said conduit being in communication with said lower portion to receive oil therefrom and the outlet of the conduit being in communication with the lower tray to discharge oil thereinto, a steam jet associated with said conduit so as to cause flow of oil from the inlet to the outlet of the conduit, other conduits connecting adjacent bubble trays from said lower bubble tray upwardly in the column, each of said other conduits having an inlet portion and an outlet portion, the inlet portion and outlet portion being in communication respectively with the lower and the upper trays of adjacent bubble trays, each of the inlet portions of said other conduit communicating with the lower tray of adjacent bubble trays and extending downwardly therefrom to communicate with the outlet portion, said outlet portion extending upwardly from the point of communication with the inlet portion to the tray next above said lower tray to discharge thereinto, means associated with each of said other conduits to cause oil to flow from said lower tray downwardly through said inlet portion thence upwardly through said outlet portion of the conduits to said bubble tray next above the lower tray of adjacent trays, vacuum creating means having its suction in communication with the upper part of the column above an upper bubble tray and its discharge connected to a point outside the column whereby a vacuum is maintained in the column and stripping medium and volatile substance is withdrawn thereby from the column at the upper part thereof, and an outlet conduit in communication with said upper bubble tray in the column and through which stripped oil is withdrawn from said upper tray and from the column.

21. Apparatus for stripping volatile substance from a liquid comprising a column, means for introducing a liquid to be stripped of volatile substance into the lower portion of the column, said column having a stripping medium inlet in the lower portion thereof through which stripping medium is introduced into the column, means for introducing a stripping medium into the lower portion of said column, a plurality of vertically spaced vapor and liquid contact devices in the column so constructed and arranged that stripping medium passes upwardly therethrough and in contact with liquid therein, conduit means having an inlet communicating with said lower portion of the column so as to receive liquid to be stripped and an outlet communicating with a vapor and liquid contact device disposed at a lower elevation in the column than other of said contact devices, means for causing liquid to flow in said conduit means from the inlet to the outlet thereof, other conduit means having an inlet communicating with said lower vapor and liquid contact device and an outlet in communication with a vapor and liquid contact device above said lower contact device, means for causing liquid to flow from the inlet to the outlet of said other conduit, means for withdrawing stripping medium and volatile substance from the upper part of the column, outlet conduit means in communication with an upper vapor and liquid contact device through which stripped liquid is withdrawn from said upper contact device and the column, recycling means comprising a thermo-compressor actuated by stripping medium under pressure, the thermo-compressor having an inlet in communication with the interior of the column intermediate the point of introduction of said liquid to be stripped into and the withdrawal of said liquid from the column and a discharge in communication with the column through said stripping medium inlet, and means for introducing stripping medium into said thermo-compressor to actuate said compressor, said recycling means being adapted to withdraw stripping medium from the column through the compressor inlet and pass the withdrawn stripping medium and stripping medium used for actuation of the thermo-compressor into the column through said stripping medium inlet.

22. The process of stripping volatiles from a liquid containing the same which comprises flowing said liquid into the lower portion of a stripping zone having a plurality of vertically spaced liquid and vapor contact zones therein, passing said liquid from the lower portion of the stripping zone to a lower vapor and liquid contact zone therein, flowing the liquid from said lower contact zone to a contact zone thereabove, passing a gaseous stripping medium upwardly from the lower portion of the stripping zone and in contact with liquid in the liquid contact zones, maintaining said stripping zone under vacuum from a point at the upper part thereof, withdrawing stripped liquid from the upper part of said stripping zone, recycling stripping medium by withdrawing a portion thereof from a point intermediate the upper and lower parts thereof and returning said withdrawn medium to the lower portion of the stripping zone, and withdrawing stripping medium and stripped volatiles from said upper part of the stripping zone.

23. In a continuous process of deodorizing animal or vegetable oils, continuously introducing oil to be deodorized into the lower portion of an elongated stripping zone having a plurality of vertically spaced liquid and vapor contact zones therein, passing said oil upwardly from said lower portion of the stripping zone and serially through said vapor and liquid contact zone from a lower contact zone to an upper contact zone in the stripping zone, passing a gaseous stripping medium upwardly from the lower portion of the stripping zone serially through said contact zones from said lower contact zone to said upper contact zone and in contact with oil therein, maintaining said stripping zone under vacuum from a point at the upper part thereof, withdrawing stripped oil from said upper contact zone, recycling stripping medium by withdrawing a portion thereof from a point intermediate the upper and lower parts thereof and returning said withdrawn medium to the lower portion of the stripping zone, and withdrawing stripping medium and stripped volatiles from said upper part of the stripping zone.

DION K. DEAN.
FRANCIS B. WHITE.

REFERENCES CITED

The following references are of record in the file of this patent:

UNITED STATES PATENTS

| Number | Name | Date |
|---|---|---|
| 1,771,385 | Subkow | July 22, 1930 |
| 1,854,002 | Subkow | Apr. 12, 1932 |
| 2,088,817 | Shoeld | Aug. 3, 1937 |
| 2,179,833 | Sondermann | Nov. 14, 1939 |
| 2,184,579 | Brucke | Dec. 26, 1939 |
| 2,368,669 | Lee et al. | Feb. 6, 1945 |
| 2,451,332 | Green | Oct. 12, 1948 |
| 2,461,694 | McKubbin | Feb. 15, 1949 |